Jan. 27, 1925. 1,524,385
W. H. BROERMAN
AUTOMOBILE LIGHT SHADE
Filed Dec. 10, 1923
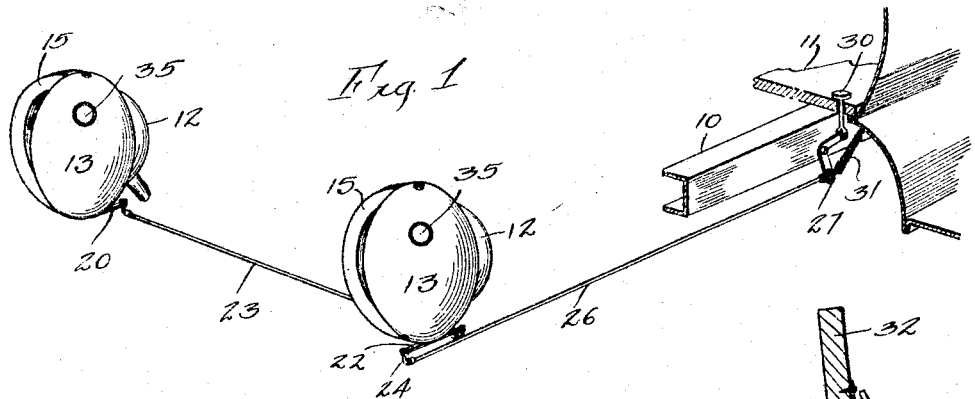
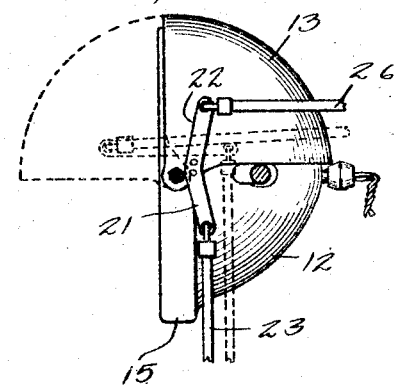
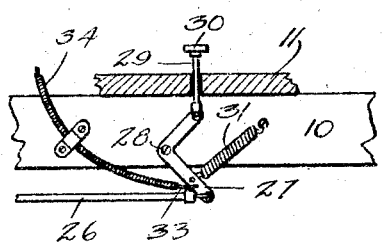
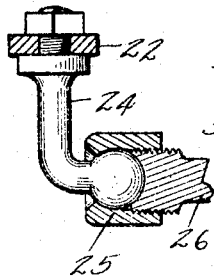
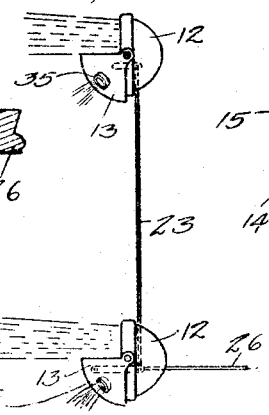
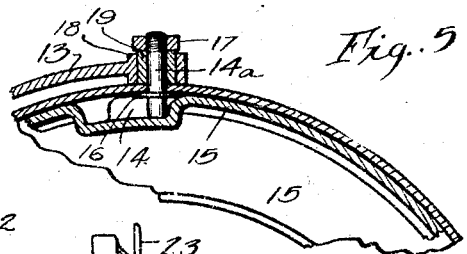
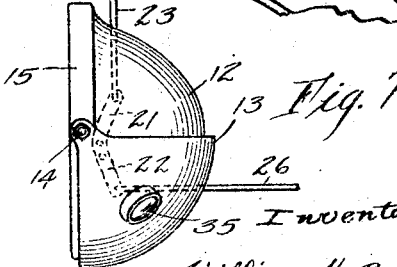
Inventor
William H. Broerman
By Bair & Freeman
Att'ys
Witness
Lynn Lutta Patented Jan. 27, 1925.

1,524,385

UNITED STATES PATENT OFFICE.

WILLIAM H. BROERMAN, OF OSKALOOSA, IOWA.

AUTOMOBILE LIGHT SHADE.

Application filed December 10, 1923. Serial No. 679,675.

*To all whom it may concern:*

Be it known that I, WILLIAM H. BROERMAN, a citizen of the United States, and a resident of Oskaloosa, in the county of Mahaska and State of Iowa, have invented a certain new and useful Automobile Light Shade, of which the following is a specification.

The object of my invention is to provide an automobile light shade structure of simple, durable and inexpensive construction by which the rays of light from vehicle lamps and the like may be controlled and directed in such manner as to afford proper light to the driver of the vehicle equipped with my device, and to avoid blinding an approaching driver or pedestrian.

More particularly, it is my object to provide in connection with automobile lamps a shade structure including shade or hood members mounted to move horizontally to and from position covering a portion of the front of a lamp especially the left-hand portion thereof.

Still a further object is to provide in such a structure suitable means for controlling the shades from the driver's position in a car.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a perspective view, partly in section, of portions of an automobile equipped with a light shade structure embodying my invention.

Figure 2 shows a top or plan view of part of my device illustrating somewhat diagrammatically the arrangement, construction and operation of the light shade structure.

Figure 3 shows an inverted plan view of one lamp and part of my light shade structure.

Figure 4 is a detailed, sectional view with parts broken away, illustrating the arrangement of part of the light shade structure with relation to the parts of a motor vehicle.

Figure 5 is a vertical, sectional view illustrating a structure for pivotally supporting the upper part of one of the hoods or shades on the lamp frame.

Figure 6 is a detailed, sectional view illustrating the joint and connecting means forming a part of the shade operating means; and Figure 7 is a top or plan view of one of the hoods or shades installed on a lamp.

The trouble which arises in connection with the use of bright lights on motor vehicles is well known. In practically all of the States, legislation has been adopted to control lights which are likely to blind and confuse approaching drivers.

It is a difficult problem in mechanical construction to provide a structure which will afford sufficient light for the driver whose car is equipped with the light without blinding an approaching driver. Most of the devices, which are now used are subject to one of two difficulties. Either they do not furnish sufficient light for the driver on whose car they are mounted, or they furnish lights that are too bright for the approaching driver.

It is my purpose to provide a light shade structure as herein set forth, which will permit the driver of the car equipped with my device ample light and which will yet protect the approaching driver against a blinding glare.

In the accompanying drawings, I have shown only such parts of a motor vehicle as are necessary for illustrating the arrangement of my device.

I have used the reference numeral 10 to indicate generally the frame of a motor vehicle, having the floor 11 and the ordinary lamps 12.

My invention involves, generally speaking, a pair of shades or hoods adapted to be normally moved to position where they are inoperative and provided with mechanism, whereby the shades, when desired, can be moved from their inoperative positions to positions standing in front of the left halves of the lens of the automobile lamps.

For accomplishing this purpose, I mount two hoods or shades to move horizontally from their positions shown in full lines in Figure 2 to positions a quarter turn to the left from their positions shown in Figure 2.

It will, of course, be understood that the hoods indicated in the drawings by the reference character 13 may be mounted in a variety of ways on suitable supports. Preferably, the hoods are mounted on the lamp frames in the manner, which will now be described.

At the upper and lower parts of the frame is a bayonet slot 14 which receives a pin 14ª fixed in the lens retaining ring 15. On the inside of the ring 15, the pin has a flange 16 and the pin then extends outwardly through the ring 15 and is screw-threaded at its outer end to receive a nut 17.

The hood 13 has a journal portion 18 in which is received a bushing 19 mounted on the pin 14ª, as shown in Figure 5 to permit the swinging of the hood with a minimum of friction.

The constructions at the top and bottom of the hood are substantially the same.

Fastened to the underside of the right-hand hood spaced rearwardly from its lower pivot point is an arm 20 which extends rearwardly and to the right of the vehicle.

Secured to the underside of the left-hand hood is a similar arm 21 forming part of a bell crank lever which has the other arm 22.

The arms 20 and 21 are connected by a link 23 having a pivotal connection with the respective arms.

Pivotally mounted on the arm 22 is a member 24, which is connected by a ball and socket joint 25 with a rod 26 running rearwardly in the machine and connected at its rear end with one arm of a bell crank lever 27.

The lever 27 is pivoted at 28 on the frame 10 of the machine. A push rod 29 is pivoted to the other arm of said bell crank lever 27 and extends upwardly through the floor board 11 and has a head 30 on its upper end.

A spring 31 connected with the bell crank lever 27 and the frame of the machine holds the bell crank lever 27 normally in position with the rod 26 at its rearward limit of movement and with the hoods or shades in inoperative positions.

The device may be operated from the dash 32 by means of a wire 33 mounted in a flexible tube 34 as illustrated in Figure 4.

Each hood 13 has a transparent bull's-eye 35 therein.

In the practical use of my improved light shade structure, the spring 31 normally holds the shades in inoperative positions.

When another machine is approached, when the lights are on, the driver steps on the head 30 or pulls the head 36 on the wire 33 for actuating the bell crank lever 27 and moving the rod 26 longitudinally forward, thus actuating the arm 22. The arm 21, connecting link 23 and the arm 20 are then actuated for moving the shades or hoods 13 to their positions shown in Figure 2, where they will shut off the rays of light on the left-hand side of the lamp.

This arrangement allows plenty of light on the right-hand side of the road and shuts off the light from the left-hand side and protects the eyes of an approaching driver from any undesirable glare.

The red bull's-eye indicates the side of the vehicle equipped with my improved shades, and there is thus provided a danger signal which is clearly visible, and is located so as to assist passing drivers to avoid collisions, and yet these bull's-eyes do not furnish any such light as to cause any blinding or confusion.

It will be seen that my shades have a double value in assuring safety to the driver who uses them and to others on the highway. Where my shades are used, there is still afforded ample light for the driver of the machine having my shades, particularly on the right side, so that he can see the road or a ditch, while at the same time the approaching driver is protected against being blinded by the glare of lights from the lamps 12.

My shades may be used on any type of vehicle, although they are particularly useful on automobiles.

While I have illustrated a particular way of mounting and operating the shades, it is to be noted that they might be mounted and operated in various ways, as for instance the shades may be arranged to swing on pivots, or to slide, or to fold to their different positions. So too a flexible hood could be mounted on guides or rollers.

Any material whereby the objects can be accomplished, may be used.

Some changes may be made in the details of the construction and arrangement of my improved light shade structure without departing from the real spirit and purpose of my invention, and it is my intention to cover by my claims, any modified forms of structure or use of mechanical equivalents, which may be reasonably included within their scope.

I claim as my invention:

1. The combination of a pair of vehicle lamps, with a pair of hoods pivoted at the fronts of the lamps to swing on vertical axes horizontally from position adjacent to the lamps at the corresponding sides thereof rearwardly of the fronts of the lamps to position in front of corresponding halves of the lamps, and back to starting position, and means for simultaneously operating the hoods.

2. The combination of a vehicle lamp having a casing open in front and having bayonet slots at its top and bottom parts, pins extended through the top and bottom of the rim having flange devices inside the frame, hoods journaled on the outwardly projecting ends of the pins to swing horizontally, the inner ends of said pins being adapted to coact with said bayonet joints.

Des Moines, Iowa, November 28, 1923.

WILLIAM H. BROERMAN.